United States Patent
Kwun et al.

(10) Patent No.: US 8,457,073 B2
(45) Date of Patent: Jun. 4, 2013

(54) APPARATUS AND METHOD FOR RELAY STATION HANDOVER IN MULTI-HOP RELAY BROADBAND WIRELESS ACCESS SYSTEM

(75) Inventors: Jong-Hyung Kwun, Seongnam-si (KR); Young-Hyun Jeon, Guri-si (KR); Dong-Ho Cho, Seoul (KR); Hyu-Dae Kim, Daejeon (KR); Ju-Yeop Kim, Anyang-si (KR); Sik Choi, Daejeon (KR); Ho-Won Lee, Chungjoo-si (KR)

(73) Assignees: Samsung Electronics Co., Ltd (KR); Korea Advanced Institute of Science and Technology (KR)

( * ) Notice: Subject to any disclaimer, the term of this patent is extended or adjusted under 35 U.S.C. 154(b) by 1160 days.

(21) Appl. No.: 11/939,911

(22) Filed: Nov. 14, 2007

(65) Prior Publication Data
US 2008/0112365 A1 May 15, 2008

(30) Foreign Application Priority Data
Nov. 14, 2006 (KR) .................. 10-2006-0112055

(51) Int. Cl.
*H04W 4/00* (2009.01)
(52) U.S. Cl.
USPC ............ 370/332; 370/331; 370/333; 370/334
(58) Field of Classification Search
USPC ............... 370/312, 315, 328, 329, 331, 352, 370/395.1, 401, 332; 455/7, 450, 440, 436, 455/449, 517, 522, 560
See application file for complete search history.

(56) References Cited

U.S. PATENT DOCUMENTS

| | | | |
|---|---|---|---|
| 6,161,014 A * | 12/2000 | Girardeau et al. | 455/436 |
| 2003/0169746 A1 * | 9/2003 | Kitazawa et al. | 370/395.42 |
| 2004/0071110 A1 * | 4/2004 | Guey et al. | 370/329 |
| 2004/0266339 A1 | 12/2004 | Larsson | |
| 2005/0088684 A1 * | 4/2005 | Naito et al. | 358/1.15 |
| 2005/0232183 A1 * | 10/2005 | Sartori et al. | 370/319 |
| 2006/0159050 A1 * | 7/2006 | Kim et al. | 370/331 |
| 2007/0217390 A1 * | 9/2007 | Laroia et al. | 370/350 |

FOREIGN PATENT DOCUMENTS

| | | |
|---|---|---|
| KR | 1020030057270 | 7/2003 |
| KR | 1020070075748 | 7/2007 |
| KR | 1020080054425 | 6/2008 |

* cited by examiner

*Primary Examiner* — Hassan Phillips
*Assistant Examiner* — Anez Ebrahim
(74) *Attorney, Agent, or Firm* — The Farrell Law Firm, P.C.

(57) ABSTRACT

A technique for managing a packet to be transmitted to a Mobile Station (MS) that performs Relay Station (RS) handover in a multi-hop relay Broadband Wireless Access (BWA) system is provided. In the BWA system, a Base Station (BS) includes a controller for determining whether to perform activecasting on an MS upon receiving an activecast request message; a scheduler for allocating a resource by taking into consideration a channel condition between the MS and a serving RS when activecasting is determined to be performed; and a transmitter for multicasting a packet, which is to be transmitted to the MS, to a target RS and the serving RS by using the allocated resource.

19 Claims, 13 Drawing Sheets

APPARATUS AND METHOD FOR RELAY STATION HANDOVER IN MULTI-HOP RELAY BROADBAND WIRELESS ACCESS SYSTEM

PRIORITY

This application claims priority under 35 U.S.C. §119(a) to a Korean patent application filed in the Korean Intellectual Property Office on Nov. 14, 2006 and assigned Serial No. 2006-112055, the entire disclosure of which is hereby incorporated by reference.

BACKGROUND OF THE INVENTION

1. Field of the Invention

The present invention relates to a multi-hop relay Broadband Wireless Access (BWA) system. More particularly, the present invention relates to an apparatus and method for managing a packet which is transmitted to a Mobile Station (MS) that performs a Relay Station (RS) handover in a multi-hop relay BWA system.

2. Description of the Related Art

In a next generation communication system, also known as the 4th Generation (4G) communication system, extensive research is being conducted to provide a Quality of Service (QoS) with a data transfer speed of about 100 Mbps. More particularly, in a Broadband Wireless Access (BWA) system, such as a wireless Local Area Network (LAN) system and a wireless Metropolitan Area Network (MAN) system, research is being conducted into a communication system that supports a high speed service at the same time as providing mobility and ensuring a QoS. An example of such a communication system is an Institute of Electrical and Electronics Engineers (IEEE) 802.16 communication system, which standard is hereby incorporated by reference.

The IEEE 802.16 communication system employs an Orthogonal Frequency Division Multiplexing (OFDM)/Orthogonal Frequency Division Multiple Access (OFDMA) scheme so as to allow a physical channel of the BWA system to support a broadband network. In order to ensure mobility of a Mobile Station (MS) and flexibility of implementing a wireless network in the IEEE 802.16 communication system, extensive research is also being conducted to effectively provide services in a wireless environment where traffic distribution and call demands rapidly change. For example, a communication system is taken into account to cope with these demands, in which a Relay Station (RS) is used to transfer data based on a multi-hop relay scheme.

In the BWA system, the RS is used to increase the coverage area or improve throughput. That is, throughput between a Base Station (BS) and an MS can be improved when the RS is located in a specific area having a poor channel condition. In addition, the BS can communicate with an MS that exists outside a coverage area of the BS when the RS is located near a cell boundary.

In general, since RSs are located within a cell of a BS, RS-to-RS handover occurs more frequently than BS-to-BS handover That is, handover occurs more frequently when an RS is used, which leads to erroneous conditions such as a packet loss and a service delay.

In a situation where an RS is not used (i.e., communication is achieved only between a BS and an MS), bicasting is used to avoid the erroneous conditions caused by a handover. In the bicasting process, as shown in FIG. 1, a data packet to be transmitted to an MS is transmitted to two BSs, where the MS is located in a boundary area of the two BSs, that is, handover is expected to be performed. Therefore, after the MS performs handover, a target BS does not have to receive from a serving BS a data packet which is buffered to be transmitted to the MS. However, since the bicasting corresponds to multicasting in a wired network, it is difficult to apply the bicasting to a wireless network environment using, for example, the RS and the BSs.

As described above, when an RS is used in a multi-hop relay BWA system, a system performance deteriorates due to a frequent handover. Although the bicasting has been proposed to avoid the system performance deterioration, it is not appropriate to apply the bicasting in a wireless network environment using the RS. Therefore, there is a need for a method for continuously providing a service to an MS that performs inter-RS handover.

SUMMARY OF THE INVENTION

An aspect of the present invention is to address at least the above-mentioned problems and/or disadvantages and to provide at least the advantages described below. Accordingly, an aspect of the present invention is to provide an apparatus and method for continuously providing a service to a Mobile Station (MS) that performs inter-Relay Station (RS) handover in a multi-hop relay Broadband Wireless Access (BWA) system.

Another aspect of the present invention is to provide an apparatus and a method for transmitting a buffered data packet to an expected target RS in a multi-hop relay BWA system.

According to an aspect of the present invention, a Base Station (BS) apparatus in a multi-hop relay BWA system is provided. The apparatus includes a controller for determining whether to perform activecasting on an MS upon receiving an activecast request message; a scheduler for allocating a resource in consideration of a channel condition between the MS and a serving RS when it is determined to perform activecasting; and a transmitter for multicasting a packet, which is to be transmitted to the MS, to a target RS and the serving RS by using the allocated resource.

According to another aspect of the present invention, an RS apparatus in a multi-hop relay BWA system is provided. The apparatus includes a processor for detecting multicasting resource region information from an activecast start message received from a BS; a receiver for receiving a packet which is to be transmitted to an MS that performs RS handover by using the resource region; a buffer for storing the received packet.

According to another aspect of the present invention, a method of transmitting a packet of a BS in a multi-hop relay BWA system is provided. The method includes determining whether to perform activecasting on an MS upon receiving an activecast request message; allocating a resource in consideration of a channel condition between the MS and a serving RS when it is determined to perform activecasting; and multicasting a packet, which is to be transmitted to the MS, to a target RS and the serving RS by using the allocated resource.

According to another aspect of the present invention, a method of relaying a packet of an RS in a multi-hop relay BWA system is provided. The method includes detecting multicasting resource region information from an activecast start message received from a BS; receiving a packet which is to be transmitted to an MS that performs RS handover by using the resource region; storing the received packet.

BRIEF DESCRIPTION OF THE DRAWINGS

The above and other aspects, features and advantages of certain exemplary embodiments of the present invention will become more apparent from the following detailed description when taken in conjunction with the accompanying drawings in which.

DETAILED DESCRIPTION OF THE PREFERRED EMBODIMENTS

Preferred embodiments of the present invention will be described below with reference to the accompanying drawings. In the following description, well-known functions or constructions are not described in detail since they would obscure the invention in unnecessary detail.

A technique of the present invention will be described hereinafter in which a packet is provided to a target Relay Station (RS), wherein the packet is to be transmitted to a Mobile Station (MS) that performs communication by using a Relay Station (RS) in a multi-hop relay Broadband Wireless Access (BWA) system. According to the technique, when the MS performs inter-RS handover, the packet to be transmitted is provided to both a serving RS and a target RS, thereby reducing a handover delay of the MS. Although the BWA system to be described below is an Orthogonal Frequency Division Multiplexing (OFDM) based system, this is for exemplary purpose only. Thus, the present invention may also be applied to other types of multi-hop relay BWA systems.

Figure 1:
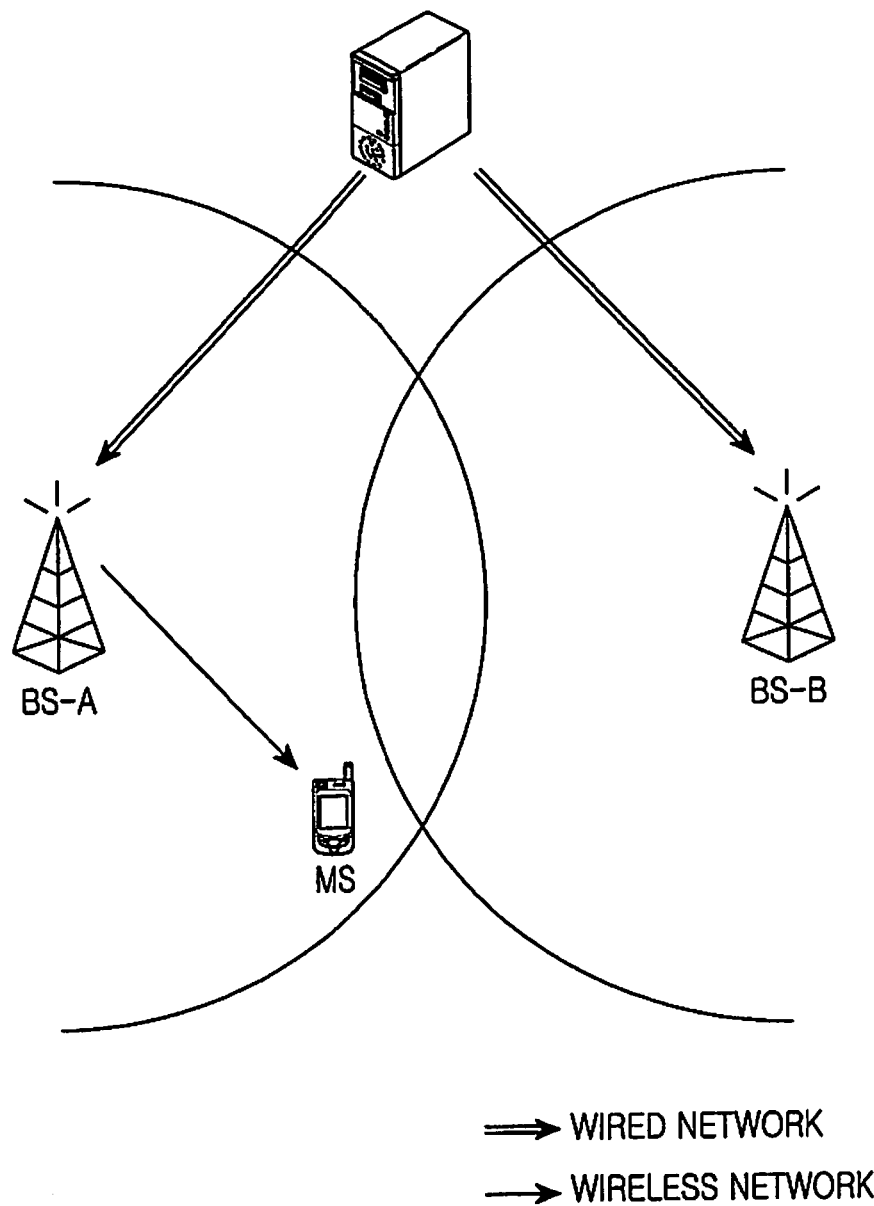
FIG. 1 illustrates a data packet receiving process performed by a Base Station (BS) by using a bicasting method in a conventional Broadband Wireless Access (BWA) system.
Figure 2A:
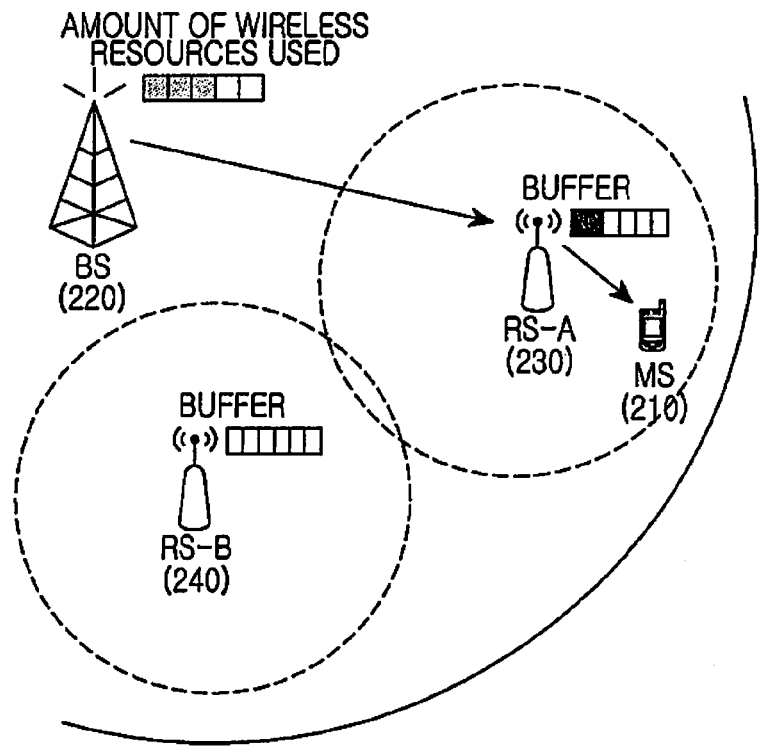
FIGS. 2A and 2B illustrate communications between a BS and a Relay Station (RS) when a Mobile Station (MS) moves in a multi-hop relay BWA system according to the present invention.
Figure 2B:
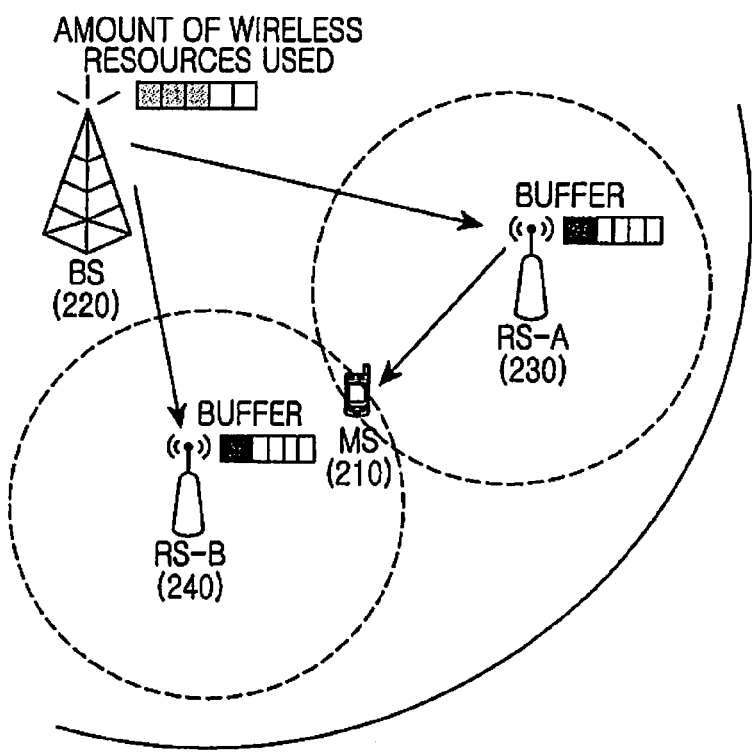

FIGS. 2A and 2B illustrate communications between a BS and an RS when an MS moves in a multi-hop relay BWA system according to the present invention.

Referring to FIG. 2A, an MS 210 is located near an RS-A 230. A BS 220 transmits a data packet, which is to be transmitted to the MS 210, to the RS-A 230. The RS-A 230 transmits the data packet received from the BS 220 to the MS 210.

In this case, when the MS 210 moves as shown in FIG. 2B, the BS 220 decides that the MS 210 will perform handover to the RS-B 240 and thus multicasts the data packet, which is to be transmitted to the MS 210, to the RS-A 230 and an RS-B 240. The amount of wireless resources used in the multicasting process is determined by taking into consideration only a channel with the RS-A 230. Therefore, a wireless resource is not additionally consumed when the data packet is transmitted to the RS-B 240 as shown in FIG. 2A and FIG. 2B.

If an unused redundant wireless resource exists, the BS 220 utilizes the redundant wireless resource in the multicasting process. By doing so, the data packet can be transmitted to the RS-B 240 in a more reliable manner. The handover decision may vary according to embodiments of the present invention.

If RS handover is performed in this manner, by using the aforementioned multicasting scheme, this will be referred as activecasting. That is, the activecasting is a simultaneous multicasting scheme for the purpose of minimizing RS-to-RS handover delay. The following description will be explained in consideration of two types of multi-hop systems, that is, a multi-hop system in which an MS can recognize an RS and a multi-hop system in which an MS cannot recognize an RS.

Figure 3:
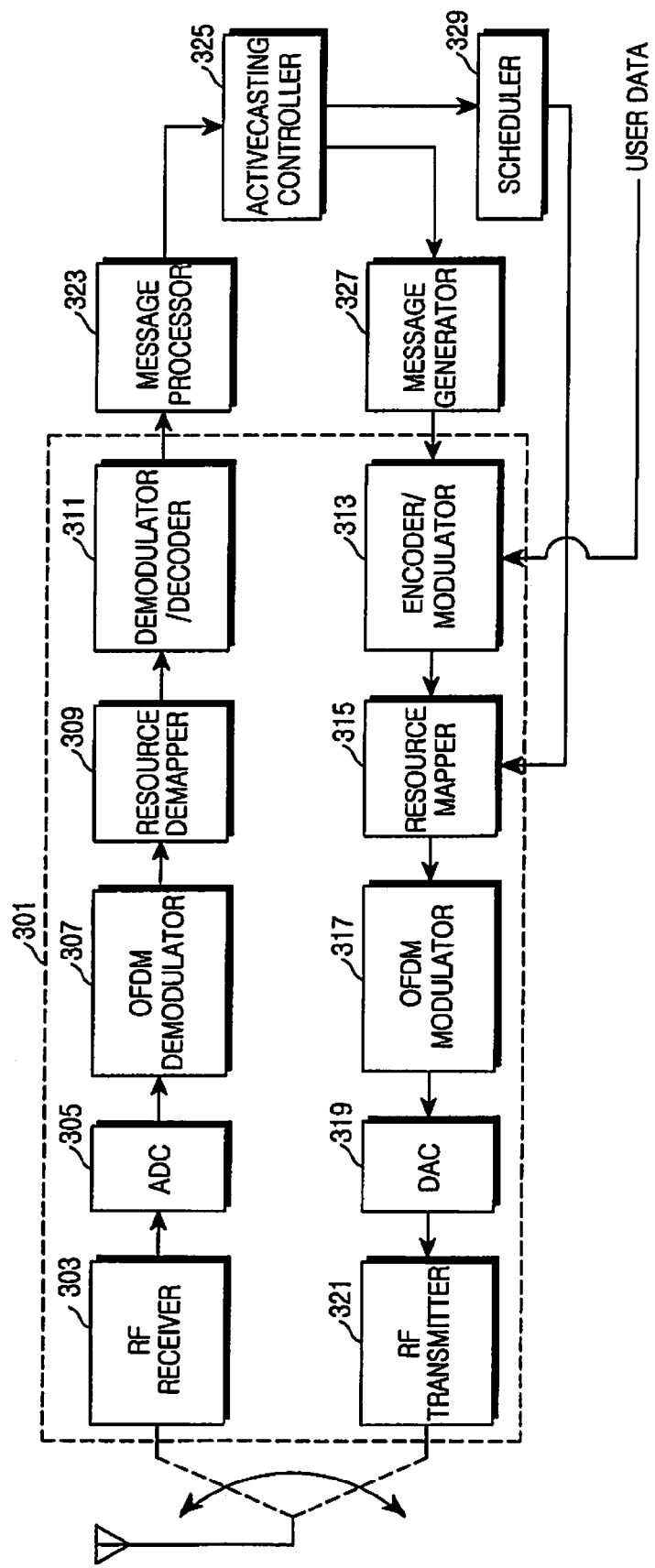
FIG. 3 is a block diagram illustrating a BS in a multi-hop relay BWA system according to the present invention.

FIG. 3 is a block diagram illustrating a BS in a multi-hop relay BWA system according to the present invention.

Referring to FIG. 3, the BS includes a Radio Frequency (RF) communicator 301, a message processor 323, an activecasting controller 325, a message generator 327, and a scheduler 329.

The RF communicator 301 performs signal processing to transmit and receive a data packet through a wireless channel. The RF communicator 301 includes an RF receiver 303, an Analog to Digital Converter (ADC) 305, an OFDM demodulator 307, a resource demapper 309, a demodulator/decoder 311, an encoder/modulator 313, a resource mapper 315, an OFDM modulator 317, a Digital to Analog Converter (DAC) 319, and an RF transmitter 321.

The RF receiver 303 converts an RF signal received through an antenna into a baseband analog signal. The ADC 305 converts an analog signal provided from the RF receiver 303 into a digital signal. The OFDM demodulator 307 converts a time domain signal provided from the ADC 305 into a frequency domain signal by performing a Fast Fourier Transform (FFT) operation. The resource demapper 309 reconfigures a signal, which is mapped to a frequency domain and is provided from the OFDM demodulator 307, so that the signal is restored to its original format. The demodulator/decoder 311 demodulates and decodes a signal provided from the resource demapper 309 and thus outputs an information bit-stream.

The encoder/modulator 313 encodes and modulates an information bit-stream provided from an upper stage and thus outputs a complex symbol signal. The resource mapper 315 maps a signal provided from the encoder/modulator 313 to a sub-carrier. The OFDM modulator 317 converts a signal provided from the resource mapper 315 into a time domain signal by performing an Inverse FFT (IFFT) operation. The DAC 319 converts a digital signal provided from the OFDM modulator 317 into an analog signal. The RF transmitter 321 converts a baseband signal provided from the DAC 319 into an RF signal and then transmits the RF signal through the antenna.

The message processor 323 detects a message received from an MS or an RS. In particular, according to the present invention, the message processor 323 detects an activecast request message received from the MS or the target RS. The activecast request message may be generated from the MS or the RS according to whether the MS recognizes the RS. That is, if the MS recognizes the RS, the activecast request message may be generated by the MS. Otherwise, the activecast request message may be generated by the RS.

The activecasting controller 325 controls operations for performing activecasting. Specifically, when the message processor 323 detects the activecast request message, the activecasting controller 325 allows an activecast start message to be transmitted to the target RS and informs the scheduler 329 that activecasting is performed on a data packet transmitted to the MS. The activecasting controller 325 allows information on a completely transmitted packet to be transmitted to the target RS, wherein the information is periodically received from a serving RS while the activecasting is performed. For example, the information on a completely transmitted packet may be detected in response to an ACKnowledge (ACK)/Non-ACKnowledge (NACK) based on an Automatic Repeat reQuest (ARQ).

The message generator 327 generates a message to be transmitted to the MS and the RS. In particular, according to the present invention, the message generator 327 generates the activecast start message and an activecast end message to be transmitted to the target RS. For example, when using an IEEE 802.16j system, the activecast start message may have a format shown in Table 1 below.

TABLE 1

| SYNTAX | SIZE(bits) | NOTES |
|---|---|---|
| ACT-Start_Message_Format( ){ | | |
|   Management Message Type | 8 | |
|   RS_CID | 16 | RS that activecasts for CID of Traffic |
|   CID | 16 | |
|   TLV Encoded Information | variable | |
| } | | |

When the BS transmits to an RS a message having a format of Table 1, the RS checks for a traffic zone in which activecasting is performed by using 'CID' of Table 1, and stores in a buffer data received through the traffic zone.

In the case of using the multi-hop system in which the MS cannot recognize the RS, the message generator 327 generates a message that requests the MS to send a pilot signal, and thus generates a message that requests the RS to estimate a channel with the MS. For example, when using the IEEE 802.16j system, the pilot transmission request message and the channel estimation request message may be contained in a MAP message by using a sounding Information Element (IE) as shown in Table 2 below.

TABLE 2

| SYNTAX | SIZE(bits) | NOTES |
|---|---|---|
| UL_Sounding_Command_IE( ) | | |
|   Extended-2 UIUC | 4 | UL_sounding_command_IE( ) = 0x04 |
|   Length | 8 | variable |
|   Sounding_Type | 1 | 0 = Type A, 1 = Type B |
|   Send Sounding Report Flag | 1 | |
|   Sounding_Relevance_Flag | 1 | 0 = Sounding relevance is the same for all CIDs<br>1 = Sounding relevance is specified for each CID |
|   N_CID | 2 | variable |
|   for(j=0; j<NUM of CIDs; j++) | | |
|     RS_CID | 16 | The CIDs of RSs to listen sounding |
|   if(Sounding_Relevance_Flag==0){ | | |
|     Sounding_Relevance | 1 | 0 = All CIDs respond in the frame carrying the instruction<br>1 = All CIDs respond in next frame |
|     Reserved | 2 | Shall be set to zero |
|   } else { | | |
|     Reserved | 3 | Shall be set to zero |
|   } | | |

When the BS broadcasts a MAP message containing the sounding IE shown in Table 2, in response thereto, the MS transmits a pilot signal. In addition, RSs corresponding to 'RS_CID' of Table 2 receive the pilot signal and thus estimate a channel with the MS.

The scheduler 329 allocates resources for performing communication with the RSs. In particular, according to the present invention, the scheduler 329 determines the amount of resources used for activecasting by taking into consideration a channel condition with the serving RS. If a redundant wireless resource exists, the scheduler 329 utilizes the redundant wireless resource in the activecasting.

Figure 4:
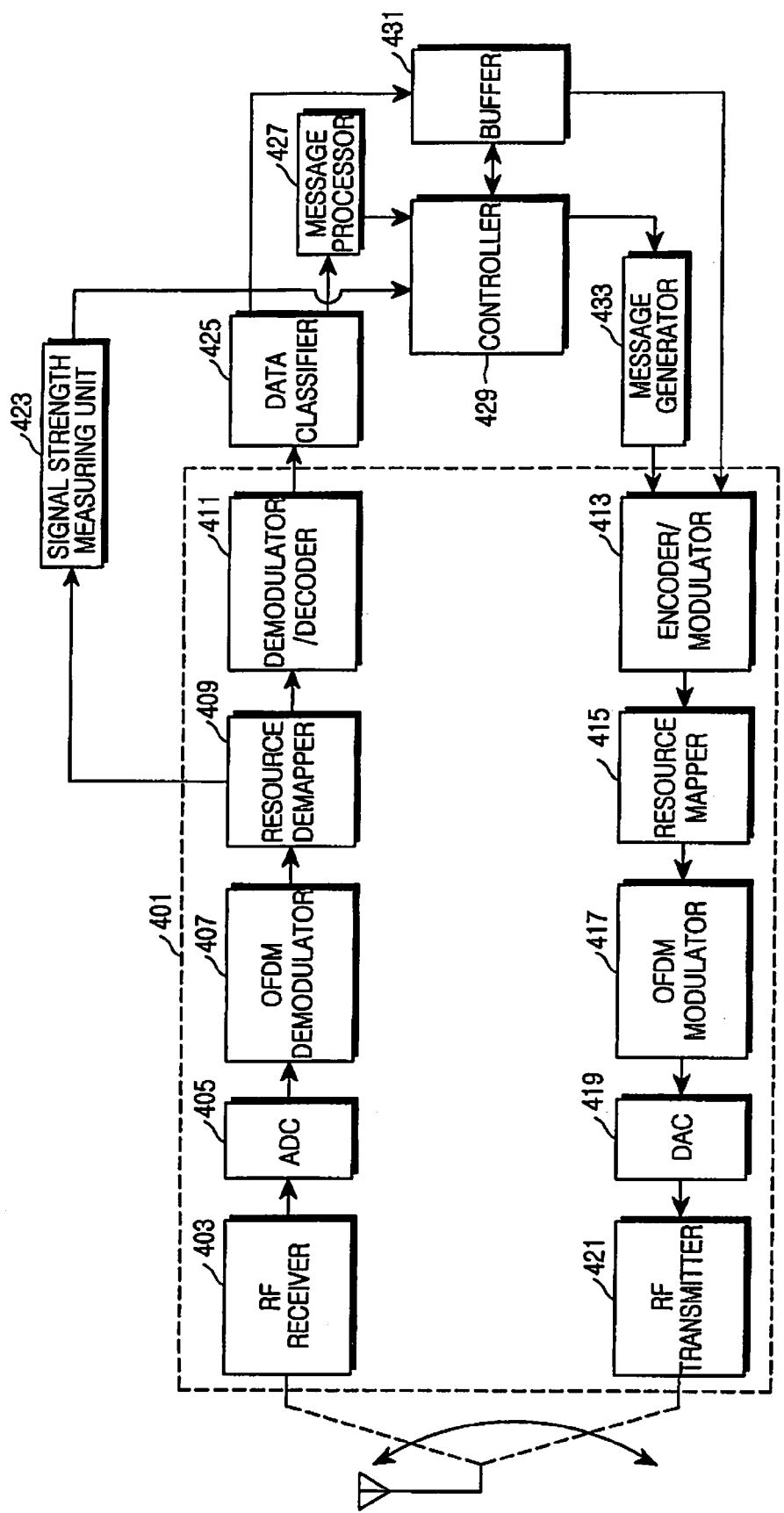
FIG. 4 is a block diagram illustrating an RS in a multi-hop relay BWA system according to the present invention.

FIG. 4 is a block diagram illustrating an RS in a multi-hop relay BWA system according to the present invention.

Referring to FIG. 4, the RS includes an RF communicator 401, a signal strength measuring unit 423, a data classifier 425, a message processor 427, a controller 429, a buffer 431, and a message generator 433.

The RF communicator 401 performs signal processing so as to transmit and receive a data packet through a wireless channel. The RF communicator 401 includes an RF receiver 403, an ADC 405, an OFDM demodulator 407, a resource demapper 409, a demodulator/decoder 411, an encoder/modulator 413, a resource mapper 415, an OFDM modulator 417, a DAC 419, and an RF transmitter 421.

The RF receiver 403 converts an RF signal received through an antenna into a baseband analog signal. The ADC 405 converts an analog signal provided from the RF receiver 403 into a digital signal. The OFDM demodulator 407 converts a time domain signal provided from the ADC 405 into a frequency domain signal by performing an FFT operation.

The resource demapper 409 reconfigures a signal, which is mapped to a frequency domain and is provided from the OFDM demodulator 407, so that the signal is restored to its original format. Further, the resource demapper 409 extracts a pilot signal and outputs the pilot signal to the signal strength measuring unit 423. In addition, the resource demapper 409 outputs an information signal to the demodulator/decoder 411. The demodulator/decoder 411 demodulates and decodes a signal provided from the resource demapper 409 and thus outputs an information bit-stream.

The encoder/modulator 413 encodes and modulates an information bit-stream provided from an upper stage and thus outputs a complex symbol signal. The resource mapper 415 maps a signal provided from the encoder/modulator 413 to a sub-carrier. The OFDM modulator 417 converts a signal provided from the resource mapper 415 into a time domain signal by performing an IFFT operation. The DAC 419 converts a digital signal provided from the OFDM modulator 417 into an analog signal. The RF transmitter 421 converts a baseband signal provided from the DAC 419 into an RF signal and then transmits the RF signal through the antenna.

The signal strength measuring unit 423 measures a strength of a signal received from the MS by using a pilot signal provided from the resource demapper 409.

The data classifier 425 classifies an information bit-stream provided from the demodulator/decoder 411 so as to output a message to the message processor 427 and to output to the buffer 431 an activecasting data packet which is received from the BS.

The message processor 427 detects a message provided from the data classifier 425. In particular, according to the present invention, the message processor 427 detects an activecast start message and an activecast end message received from the BS.

The controller 429 controls overall operations for a Media Access Control (MAC) layer of the RS. In particular, according to the present invention, the controller 429 controls the buffer 431 to store the activecasting data packet. Upon detecting the reception of the activecast end message from the BS, the controller 429 controls the buffer 431 to delete all activecasting data packets stored therein. During activecasting, if information on a completely transmitted data packet is periodically received from the BS, the controller 429 controls the buffer 431 to delete the completely transmitted data packet among the stored activecasting data packet.

In the case of using the multi-hop system in which the MS can recognize the RS, signal strength information, which is measured at the MS by using signals received from neighboring RSs and is fed back from the MS, after being measured by the MS is relayed to the BS under the control of the controller 429. In the case of using the multi-hop system in which the MS cannot recognize the RS, the signal strength information provided from the signal strength measuring unit 423 is continuously fed back to the BS.

The buffer 431 under the control of the controller 429 stores, outputs, or deletes a user data packet provided from the data classifier 425.

The message generator 433 generates a message to be transmitted to the MS and the BS. In particular, according to the present invention, when a strength of a signal received from a specific MS is greater than or equal to a threshold, the message generator 433 generates an activecast request message for a data packet to be transmitted to that MS. For example, when using the IEEE 802.16j system, the activecast request message may have a format as shown in Table 3 below.

TABLE 3

| SYNTAX | SIZE(bits) | NOTES |
|---|---|---|
| ACT-REQ_Message_Format( ){ | | |
| Management Message Type | 8 | |
| RS_CID | 16 | RS that activecasts for |
| TLV Encoded Information | variable | 0 = Type A, 1 = Type B |
| } | | |

Figure 5:
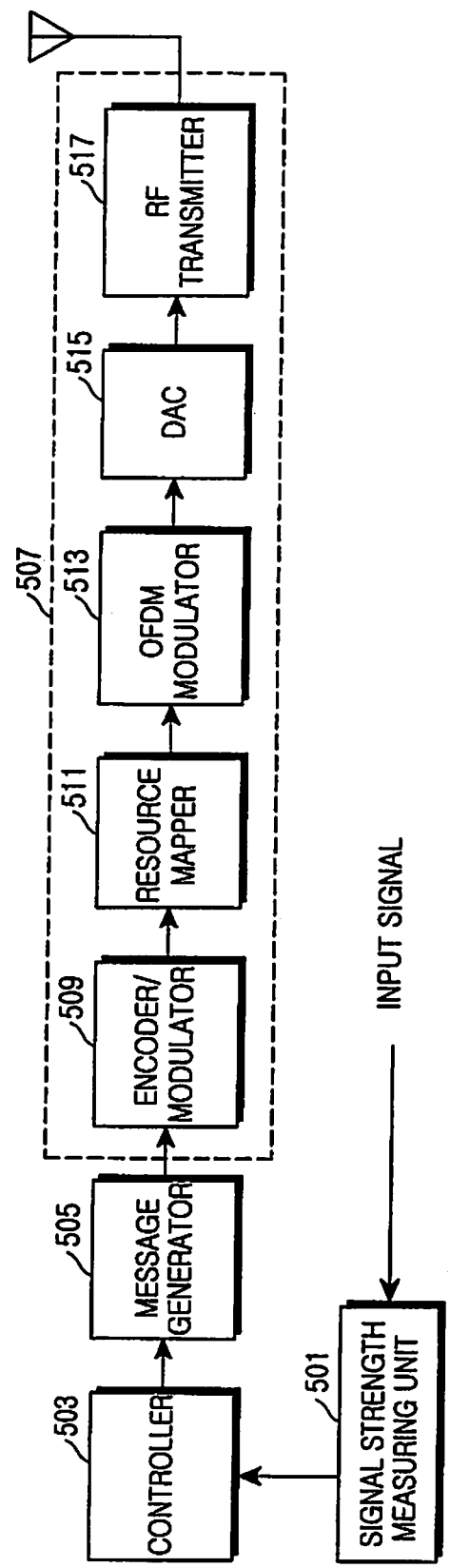
FIG. 5 is a block diagram illustrating an MS in a multi-hop relay BWA system according to the present invention.

FIG. 5 is a block diagram illustrating an MS in a multi-hop relay BWA system according to the present invention.

Referring to FIG. 5, the MS includes a signal strength measuring unit 501, a controller 503, a message generator 505, and an RF communicator 507.

The signal strength measuring unit 501 measures a strength of an input signal by using a pilot signal received from a BS or an RS. If the MS cannot recognize the RS, the signal strength measuring is performed on the BS or a serving RS. However, if the MS can recognize the RS, the signal strength measuring is performed on the serving RS, the BS or a neighboring RS which the MS can receive the pilot signal from.

The controller 503 controls overall operations of a MAC layer of the MS. In particular, when using the multi-hop system in which the MS can recognize the RS, the controller 503 controls the BS to request activecasting if a strength of a signal received from the neighboring RS is greater than or equal to a threshold.

The message generator 505 generates a message to be transmitted to the BS or the RS. In particular, when the MS is included in the multi-hop system in which the MS can recognize the RS, according to the present invention, the message generator 505 generates an activecast request message.

The RF communicator 507 performs signal processing so as to transmit and receive a data packet through a wireless channel. The RF communicator 507 includes an encoder/modulator 509, a resource mapper 511, an OFDM modulator 513, a DAC 515, and an RF transmitter 517.

The encoder/modulator 509 encodes and modulates information bit-stream provided from an upper stage and thus outputs a complex symbol signal. The resource mapper 511 maps a signal provided from the encoder/modulator 509 to a sub-carrier. The OFDM modulator 513 converts a signal provided from the resource mapper 511 into a time domain signal by performing an IFFT operation. The DAC 515 converts a digital signal provided from the OFDM modulator 513 into an analog signal. The RF transmitter 517 converts a baseband signal provided from the DAC 515 into an RF signal and then transmits the RF signal through the antenna.

Operations of a BS, an RS, and an MS for performing activecasting in a multi-hop system in which the MS can recognize the RS will now be described.

Figure 6:
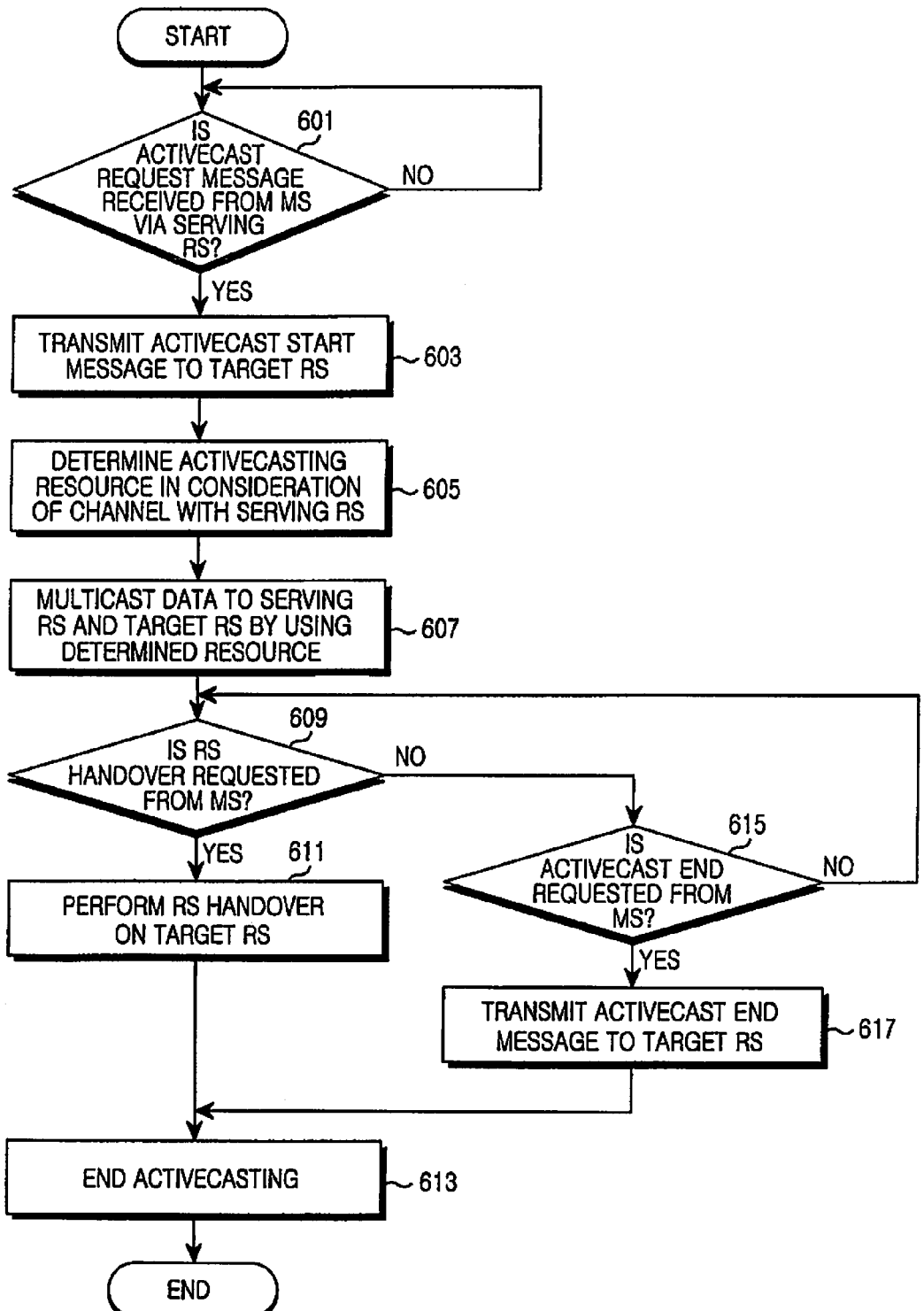
FIG. 6 is a flowchart illustrating a process performed by a BS to transmit a data packet to an RS in a multi-hop relay BWA system according to a first embodiment of the present invention.

FIG. 6 is a flowchart illustrating a process performed by a BS to transmit a data packet to an RS in a multi-hop relay BWA system according to a first embodiment of the present invention.

Referring to FIG. 6, in step 601, the BS determines if an activecast request message is received from the MS through a serving RS. The activecast request message contains information on a target RS.

Upon receiving the activecast request message, in step 603, the BS transmits an activecast start message to the target RS. The activecast start message contains information on the MS that transmitted the activecast request message.

After transmitting the activecasting start message, in step 605, the BS determines an activecasting resource by taking into consideration a channel with the serving RS. If a redundant wireless resource exists, the BS allows the activecasting resource to include the redundant wireless resource.

After determining the resource, in step 607, the BS multicasts (i.e., activecasts) a data packet, which is to be transmitted to the MS, to the serving RS and the target RS by using the determined resource. If the redundant resource is allocated to the target RS in step 605, the data packet to be transmitted to the MS is retransmitted to the target RS by using the allocated redundant resource. For buffer management of the target RS, while performing the activecasting, the BS transmits to the target RS information on a data packet completely transmitted from the serving RS. For example, the information on a completely transmitted data packet is detected in response to an ACK/NACK based on an ARQ.

In step 609, the BS determines if the MS requests handover from the serving RS to the target RS.

Upon requesting the handover, in step 611, the BS performs an RS handover process on the target RS.

After performing the handover process, in step 613, the BS ends the activecasting.

If the handover is not requested in step 609, the procedure proceeds to step 615, where the BS determines if an activecast end request is received from the MS. The activecast end request is detected when an activecast end request message is received. If the activecast end request is not received, the process returns to step 609.

Upon detecting the activecast end request, in step 617, the BS transmits the activecast end message to the target RS.

After transmitting the activecast end message, in step 613, the BS ends the activecasting.

Figure 7:
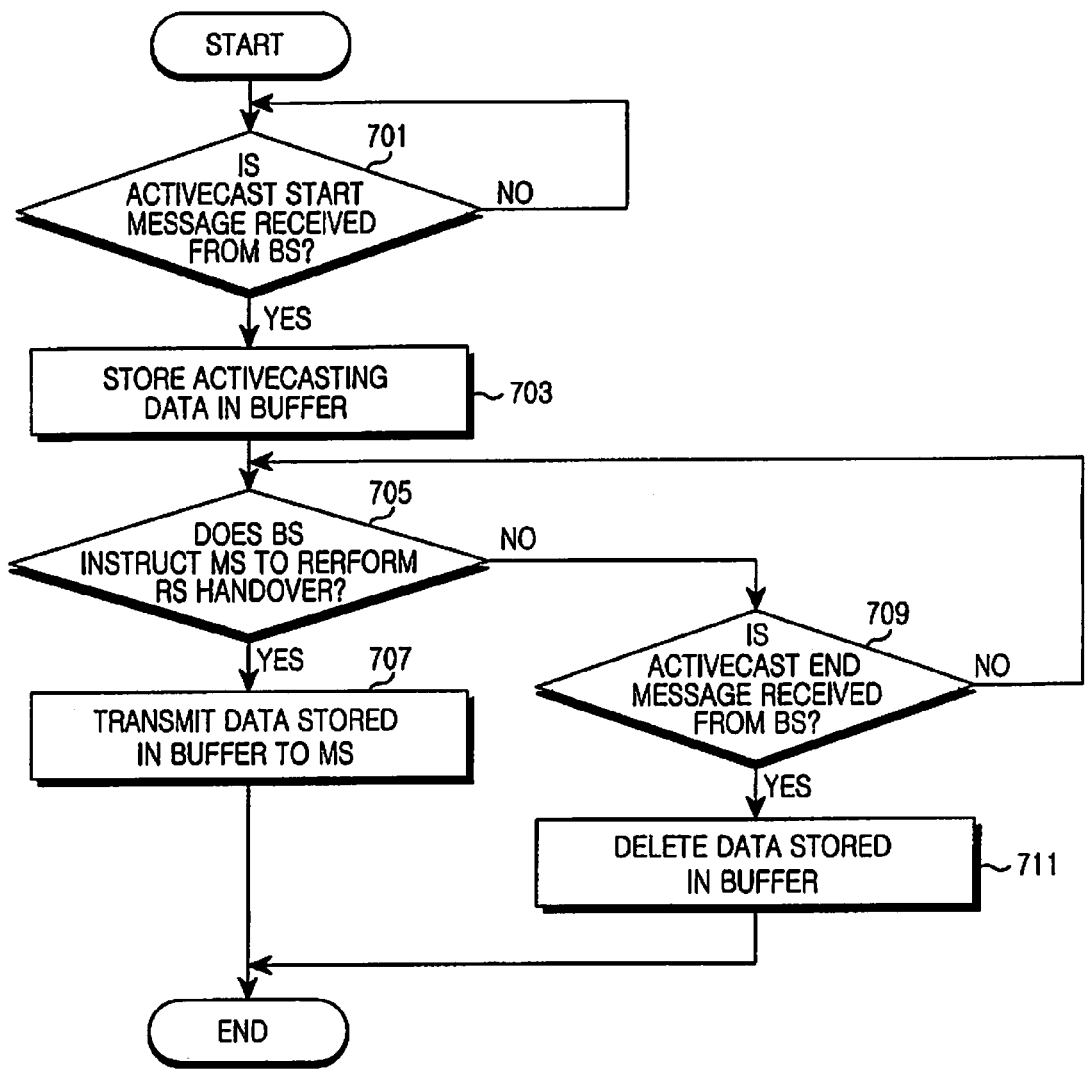
FIG. 7 is a flowchart illustrating a process performed by an RS to receive a data packet from a BS in a multi-hop relay BWA system according to a first embodiment of the present invention.

FIG. 7 is a flowchart illustrating a process performed by an RS to receive a data packet from a BS in a multi-hop relay BWA system according to a first embodiment of the present invention. An example of an operation of a target RS in the process of activecasting is illustrated in FIG. 7.

Referring to FIG. 7, in step 701, the RS determines if an activecast start message is received from the BS. The activecast start message contains information on an MS which requests activecasting.

Upon receiving the activecast start message, in step 703, the RS stores an activecasting data packet, which is transmitted from the BS to the MS, in a buffer. In this step, upon receiving information on a data packet completely transmitted from the BS, the data packet is deleted from the buffer.

In step 705, the RS determines if the BS instructs the MS to perform an RS handover process.

If the BS instructs the MS to perform the RS handover, in step 707, the RS is connected to the MS, and thereafter the data packet stored in the buffer is transmitted to the MS.

Otherwise, in step 709, the RS determines if an activecast end message is received from the BS. If the activecast end request is not received from the BS, the process returns to step 705.

Upon receiving the activecast end message, in step 711, the RS deletes the data packet stored in the buffer, that is, the data packet received by performing activecasting.

Figure 8:
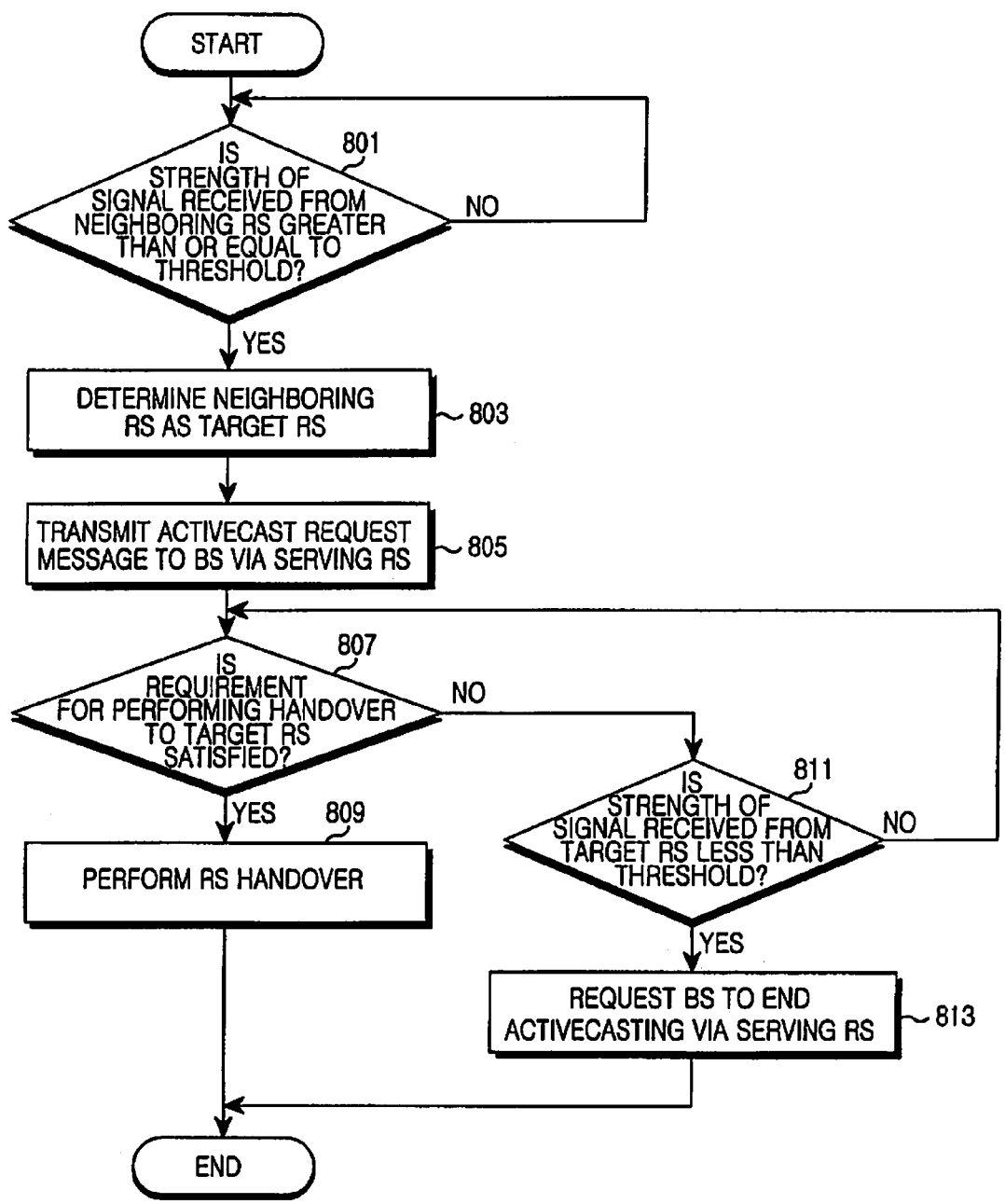
FIG. 8 is a flowchart illustrating inter-RS handover process performed by an MS in a multi-hop relay BWA system according to a first embodiment of the present invention.

FIG. 8 is a flowchart illustrating inter-RS handover process performed by an MS in a multi-hop relay BWA system according to a first embodiment of the present invention.

Referring to FIG. 8, in step 801, the MS determines if a strength of a signal received from a neighboring RS is greater than or equal to a threshold.

If the signal strength is greater than or equal to the threshold, in step 803, the MS determines the neighboring RS as a target RS.

After determining the target RS, in step 805, the MS transmits an activecast request message to the RS via a serving RS. The activecast request message contains information on the target RS.

After transmitting the activecast request message, in step 807, the MS determines if a requirement for performing handover to the target RS is satisfied. For example, it may be determined if a strength of a signal received from the target RS is greater than a strength of a signal received from the serving RS and if the difference thereof is greater than or equal to a handover threshold.

If the handover requirement is satisfied, in step 809, the MS performs RS handover on the target RS.

Otherwise, in step 811, the MS determines if the strength of the signal received from the target RS is less than the threshold. If the strength of the signal is not less than the threshold, the process returns to step 807.

If the signal strength is less than the threshold, in step 813, the MS requests the BS to end the activecasting via the serving RS.

Now, operations of a BS and an RS for performing activecasting in a multi-hop system in which an MS cannot recognize the RS will be described.

Figure 9:
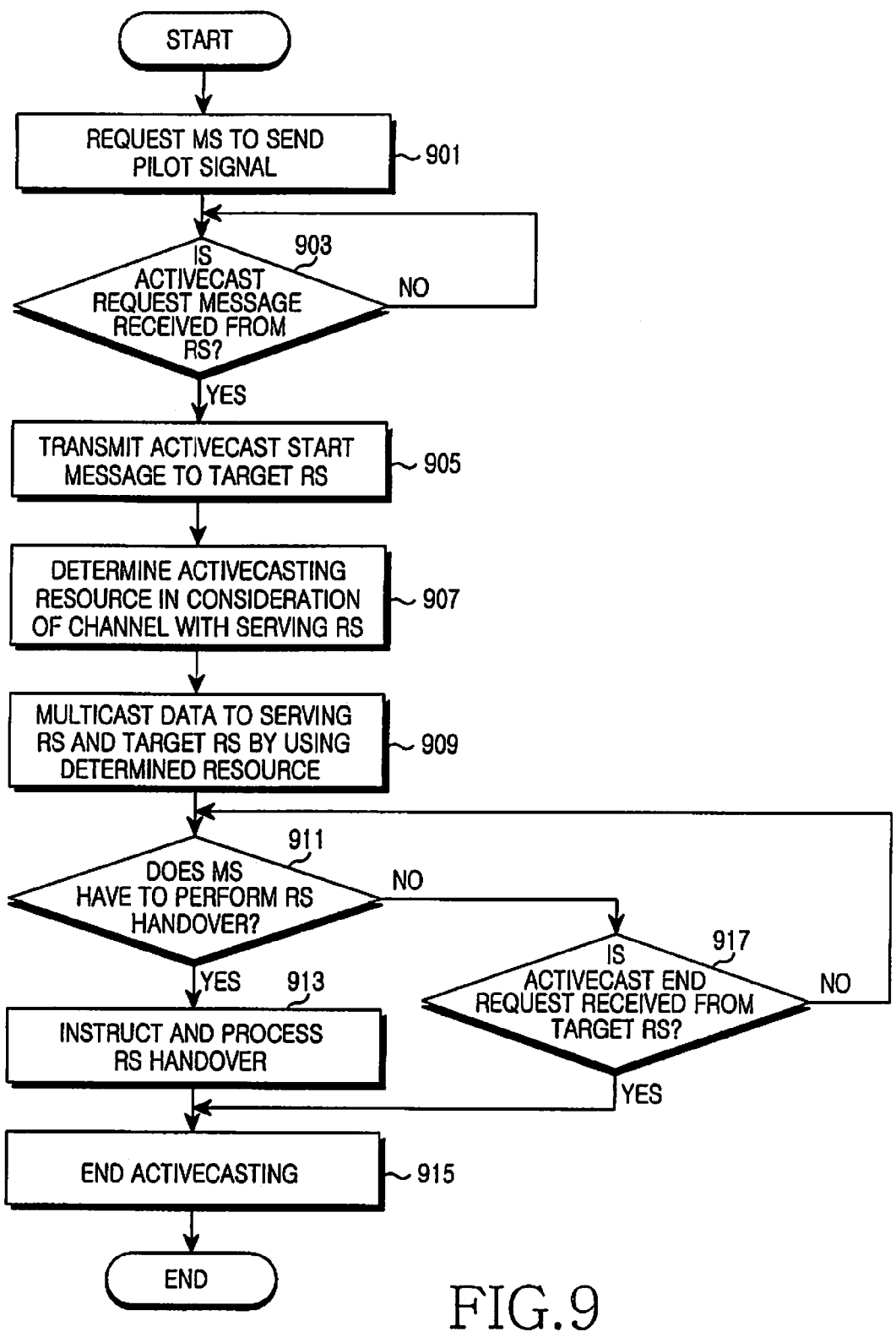
FIG. 9 is a flowchart illustrating a process performed by a BS to transmit a data packet to an RS in a multi-hop relay BWA system according to a second embodiment of the present invention.

FIG. 9 is a flowchart illustrating a process performed by a BS to transmit a data packet to an RS in a multi-hop relay BWA system according to a second embodiment of the present invention.

Referring to FIG. 9, in step 901, the BS requests the MS to transmit a pilot signal. The pilot signal transmission request is periodically performed so that a channel between the RS and the MS can be continuously monitored. A time period for performing this request may be regulated according to a condition between the RS and the MS.

In step 903, the BS determines if an activecast request message is received from the RS. The activecast request message contains information on an MS that requires the activecasting.

Upon receiving the activecast request message, in step 905, the BS transmits an activecast start message to an RS (i.e., target RS) which has transmitted the activecast request message.

After transmitting the activecast start message, in step 907, the BS determines an activecasting resource by taking into consideration a channel with the serving RS. If a redundant wireless resource exists, the BS allows the wireless resource for activecasting to include the redundant wireless resource.

After determining the resource, in step 909, the BS multicasts (i.e., activecasts) a data packet, which is to be transmitted to the MS, to the serving RS and the target RS by using the determined resource. For buffer management of the target RS, while performing the activecasting, the BS transmits to the target RS information on a data packet completely transmitted from the serving RS. For example, the information on a completely transmitted packet is detected in response to ACK/NACK based on ARQ.

In step 911, the BS determines if there is a need for the MS to perform RS handover according to the channel condition between the RS and the MS wherein the channel condition has been continuously monitored.

If the RS handover is necessary, in step 913, the BS instructs to perform the RS handover and performs a necessary process. That is, the BS instructs the serving RS to disconnect from the MS and instructs the target RS to connect to the MS. Thereafter, the BS modifies a connection path to the MS to a connection path to the target RS.

After performing the RS handover, in step 915, the BS ends the activecasting.

If it is determined in step 911 that the MS does not have to perform the RS handover, the procedure proceeds to step 917, and thus the BS determines if an activecast end request is received from the target RS. The activecast end request is detected when an activecast end request message is received. If the activecast end request is not detected, the process returns to step 911.

Upon detecting the activecast end request, in step 915, the BS ends the activecasting.

Figure 10:
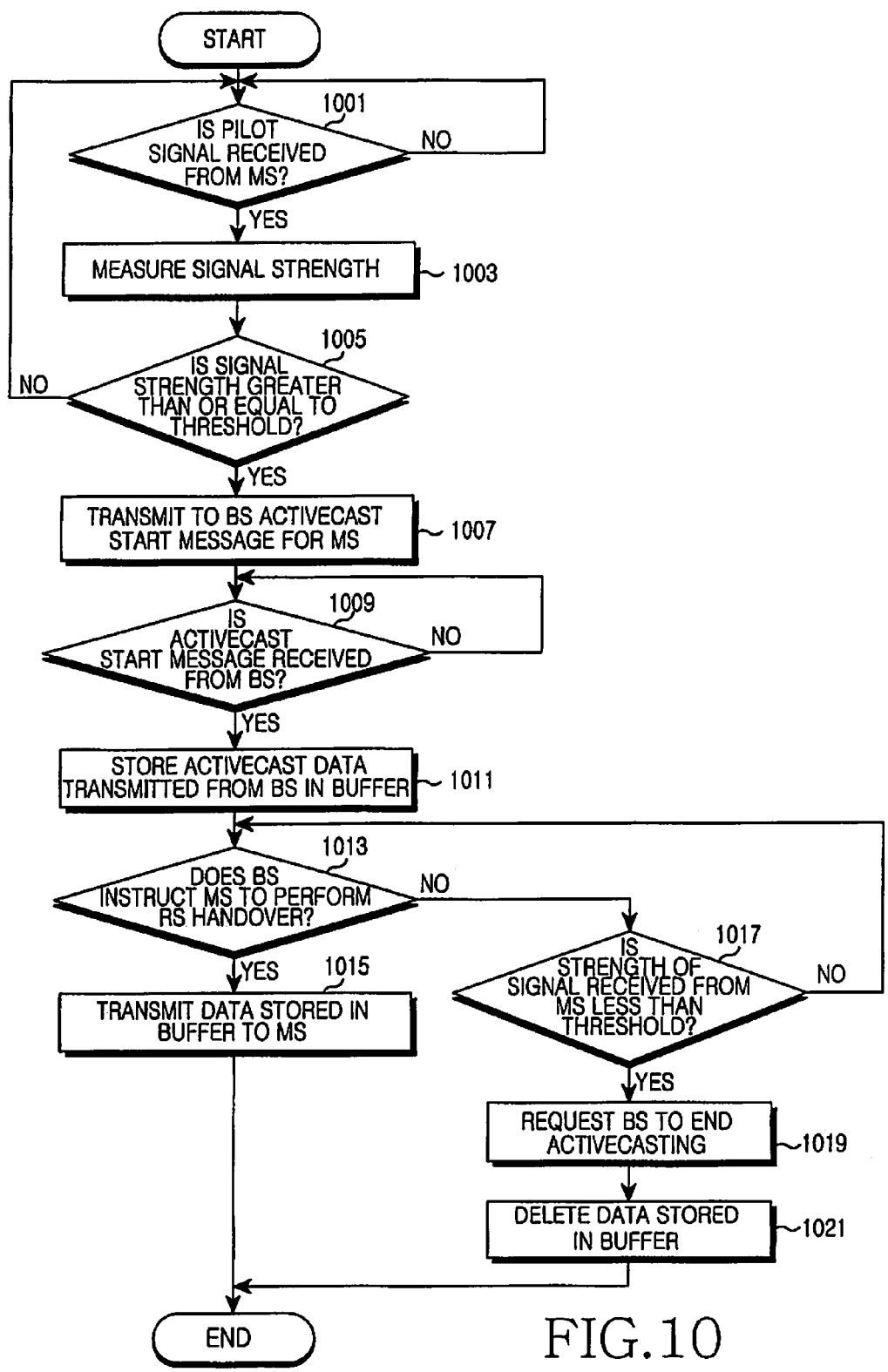
FIG. 10 is a flowchart illustrating a process performed by an RS to receive a data packet from a BS in a multi-hop relay BWA system according to a second embodiment of the present invention.

FIG. 10 is a flowchart illustrating a process performed by an RS to receive a data packet from a BS in a multi-hop relay BWA system according to a second embodiment of the present invention.

Referring to FIG. 10, in step 1001, the RS determines if a pilot signal is received from an MS.

Upon receiving the pilot signal, in step 1003, the RS measures a strength of a signal received from the MS by using the pilot signal. When the signal strength is measured by using the pilot signal, the measurement is periodically performed to monitor a channel condition with the MS. The transmission of the pilot signal from the MS is performed under the control of the BS.

In step 1005, the RS determines if the measured signal strength is greater than or equal to a threshold.

If the signal strength is greater than or equal to the threshold, in step 1007, the RS transmits to the BS an activecast request message for the MS which has transmitted the pilot signal.

After transmitting the activecast request message, in step 1009, the RS determines if an activecast start message is received from the BS. The activecast start message contains resource region identification information for the activecasting. Therefore, by using the resource region identification information, the RS can detect an activecasting resource region from a MAP message.

Upon receiving the activecast start message, in step 1011, the RS stores in a buffer a data packet, which is transmitted from the BS to the MS by performing activecasting.

In step 1013, the RS determines if the BS instructs the MS to perform RS handover. That is, it is determined if connection to the MS is instructed.

If the RS handover is instructed, in step 1015, the RS connects to the MS and transmits to the MS the data packet stored in the buffer.

Otherwise, in step 1017, the RS checks whether a strength of a signal received from the MS is less than a threshold.

If the signal strength is less than the threshold, in step 1019, the RS requests the BS to end the activecasting. That is, the RS transmits an activecast end request to the BS.

In step 1021, the RS deletes the data packet stored in the buffer, that is, the data packet received by the activecasting.

Figure 11:
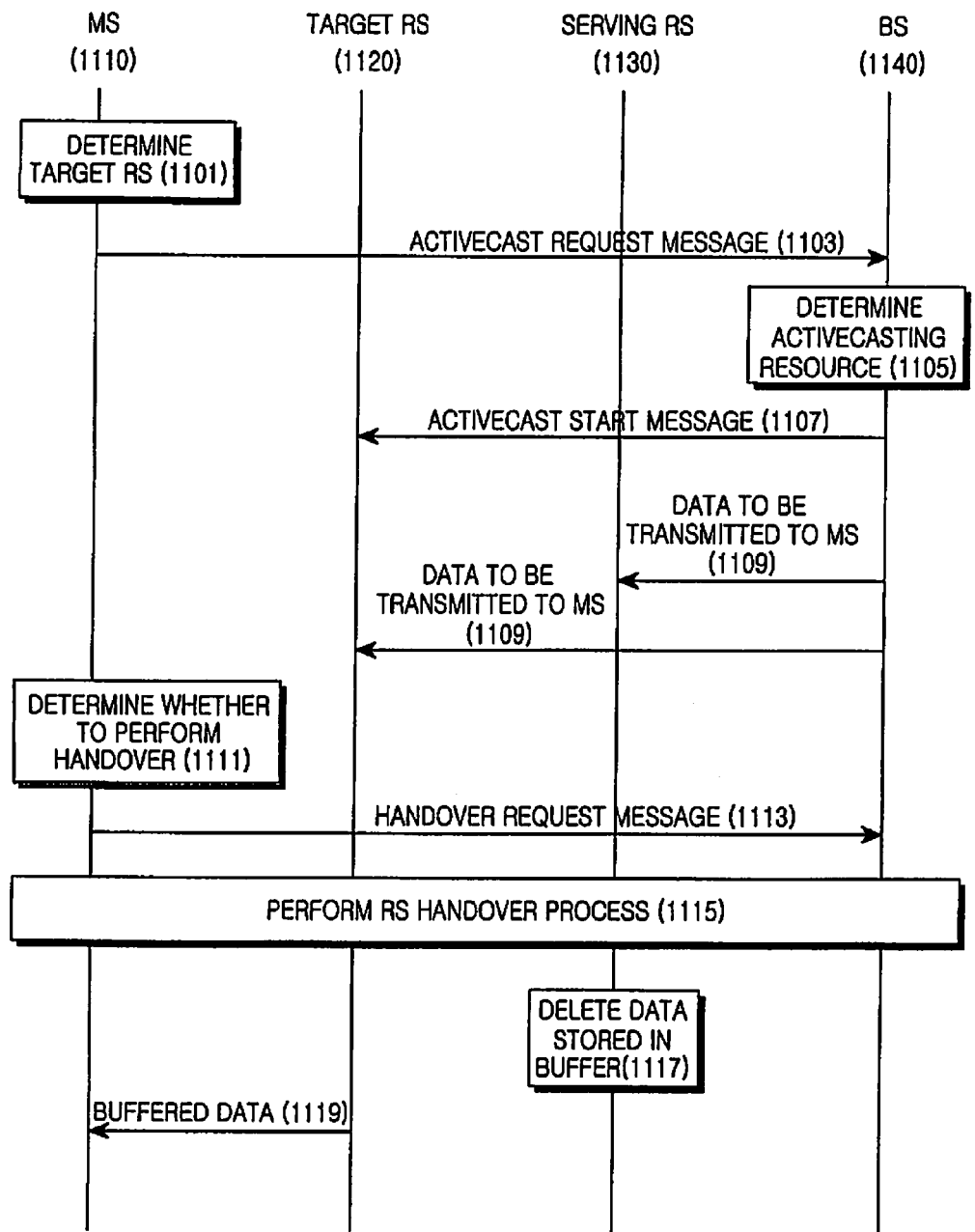
FIG. 11 illustrates a signal flow among a BS, an RS, and an MS in a multi-hop relay BWA system according to a first embodiment of the present invention.

FIG. 11 illustrates a signal flow among a BS, an RS, and an MS in a multi-hop relay BWA system according to a first embodiment of the present invention.

Referring to FIG. 11, an MS 1110 determines if a strength of a signal received from a neighboring RS is greater than or equal to a threshold while communication is made with a serving RS 1130, and then selects the neighboring RS as a target RS 1120 in step 1101.

Thereafter, the MS 1110 transmits an activecast request message to the BS 1140 via the serving RS 1130 in step 1103.

Upon receiving the activecast request message, the BS 1140 determines a resource to be used for activecasting in step 1105. In this step, the resource is determined by taking into consideration only a channel condition with the serving RS 1130. If a redundant wireless resource exists, the redundant wireless resource is additionally allocated to the target RS 1120.

Upon determining the resource, the BS 1140 transmits an activecast start message to the target RS 1120 in step 1107.

Upon receiving the activecast start message, the BS 1140 multicasts (i.e., activecasts) a data packet, which is to be transmitted to the MS, to the serving RS 1130 and the RS 1120 in step 1109.

In this case, the MS 1110 determines whether to perform RS handover when a strength of a signal received from the target RS 1120 is greater than a strength of a signal received from the serving RS 1130 in step 1111.

The MS 1110 transmits a handover request message to the BS 1140 via the serving RS 1130 in step 1113.

The BS 1140, the serving RS 1130, the target RS 1120, and the MS 1110 perform an RS handover process in step 1115.

After completing the RS handover process, the serving RS 1130 deletes all data packets which are stored in a buffer and are to be transmitted to the MS 1110 in step 1117.

The target RS 1120 transmits a data packet, which is received through activecasting and is stored in the buffer, to the MS 1110 in step 1119.

Figure 12:
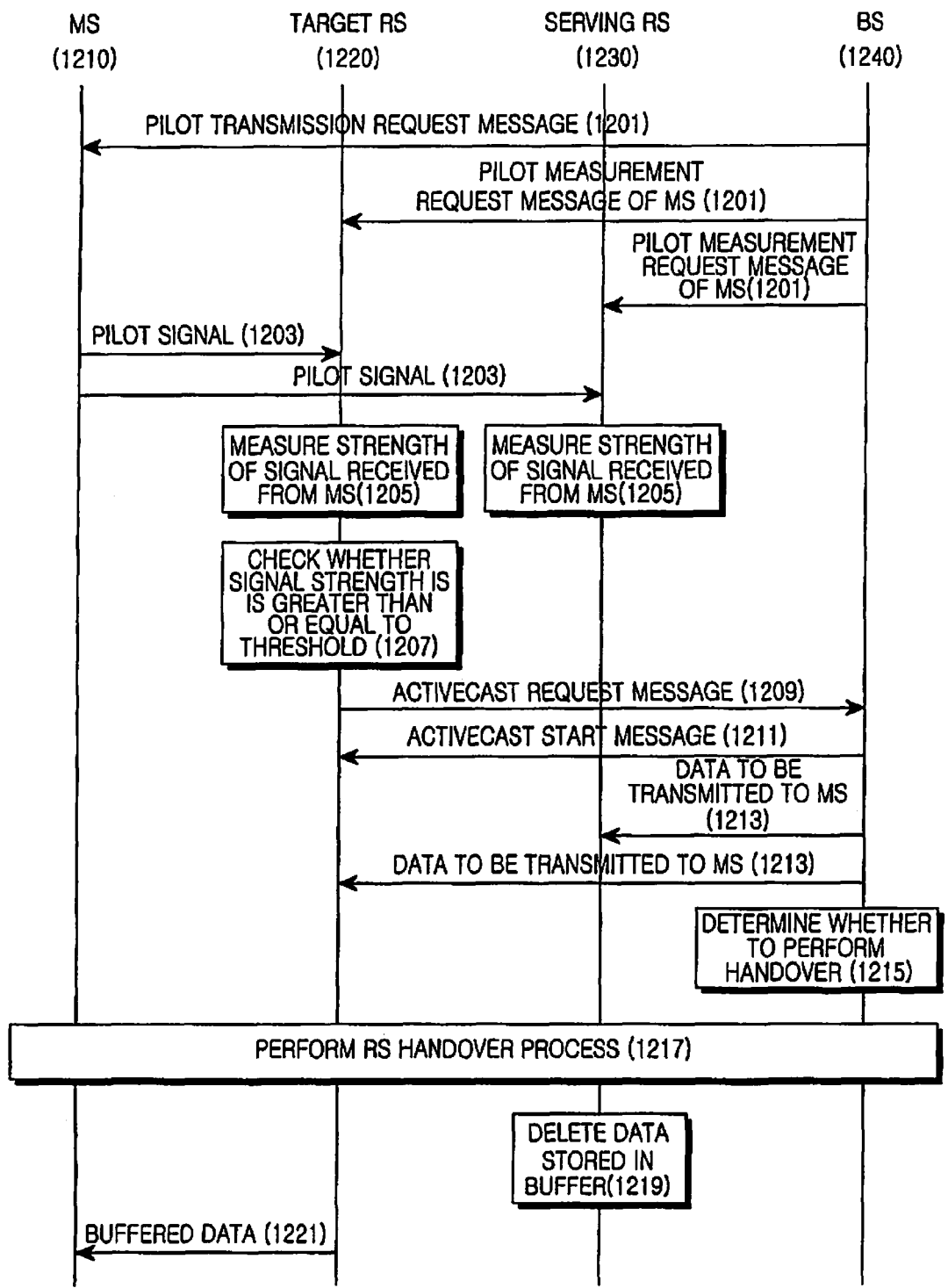
FIG. 12 illustrates a signal flow among a BS, an RS, and an MS in a multi-hop relay BWA system according to a second embodiment of the present invention.

FIG. 12 illustrates a signal flow among a BS, an RS, and an MS in a multi-hop relay BWA system according to a second embodiment of the present invention.

Referring to FIG. 12, a BS 1240 transmits a pilot transmission request message to an MS 1210 and transmits a pilot measurement request message of an MS to a plurality of RSs including a serving RS 1230 and a target RS 1220 in step 1201.

Upon receiving the pilot transmission request message, the MS 1210 transmits a pilot signal to all of the RSs including the serving RS 1230 and the target RS 1220 in step 1203.

Upon receiving the pilot signal, the serving RS 1230 and the target RS 1220 measure a strength of a signal received from the MS 1210 by using the pilot signal in step 1205. Steps 1201, 1203, and 1205 are periodically performed so that a condition of an MS-RS channel can be continuously monitored. Although not shown, the serving RS 1230 and the target RS 1220 feed back the measured signal strength to the BS 1240.

Upon measuring the signal strength, the target RS 1220 determines if the signal strength is greater than or equal to a threshold in step 1207.

If the signal strength is greater than or equal to the threshold, the target RS 1220 transmits an activecast request message to the BS 1240 in step 1209.

Upon receiving the activecast request message, the BS 1240 transmits an activecast start message to the target RS 1220 in step 1211.

Upon receiving the activecast start message, the BS 1240 multicasts (i.e., activecasts) a data packet, which is to be transmitted to the MS, to the serving RS 1230 and the target RS 1220 in step 1213.

In this case, by using the signal strength which is periodically fed back from the target RS 1220 and the serving RS 1230, the BS 1240 determines if the MS 1210 performs RS handover in step 1215.

The BS 1240, the serving RS 1230, the target RS 1220, and the MS 1210 perform an RS handover process in step 1217.

After completing the RS handover, the serving RS 1230 deletes all data packets which are stored in the buffer and are to be transmitted to the MS 1210 in step 1219.

The target RS 1220 transmits to the MS 1210 a data packet which is received through the activecasting and is stored in the buffer in step 1221.

Figure 13A:
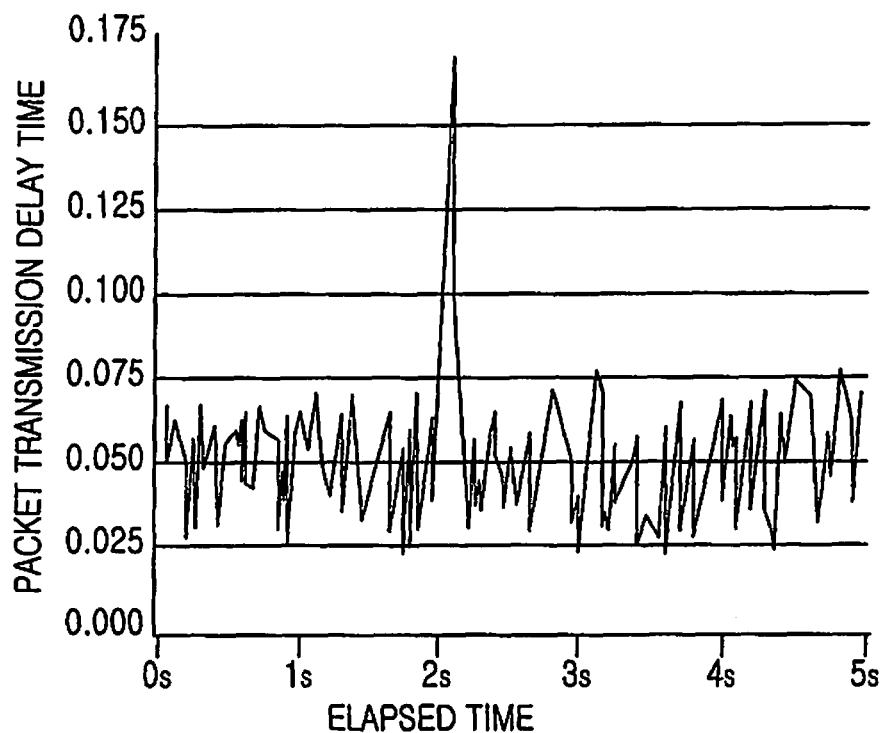
FIGS. 13A and 13B illustrate graphs showing performance of a multi-hop relay BWA system according to the present invention.
Figure 13B:
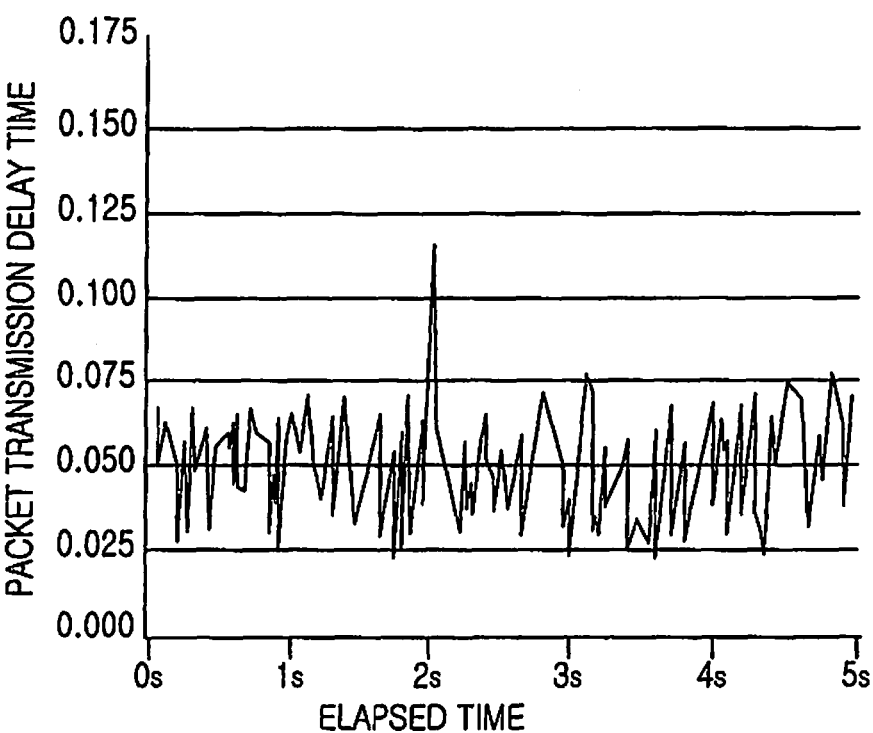

FIGS. 13A and 13B illustrate graphs showing performance of a multi-hop relay BWA system according to the present invention. FIG. 13A is a graph of a packet transmission delay time in a case where activecasting is not performed. FIG. 13B is a graph of a packet transmission delay time in a case where activecasting is performed.

Referring to the graphs of FIG. 13A and FIG. 13B, handover occurs at a time point when a packet transmission delay time rapidly increases. Significant decrease in the packet transmission delay time can be seen in the graph of FIG. 13B, that is, in a case where activecasting is performed.

An activecasting technique of the present invention has been described in which a packet to be transmitted to an MS is multicast to a serving RS and a target RS when the MS performs RS handover in a multi-hop relay BWA system. Although it has been described that one target RS is used in the aforementioned embodiments, the present invention may be also applied when a plurality of target RSs are present, and in this case, each target RS can participate in activecasting by using the method of the present invention.

According to the present invention, an expected target RS receives the same data packet as a serving RS in a multi-hop relay BWA system. Therefore, it is possible to decrease a packet transmission delay that occurs when an MS performs RS handover while communication via the RSs. As a result, a service can be continuously provided.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A Base Station (BS) apparatus in a multi-hop relay Broadband Wireless Access (BWA) system, comprising:
   a receiver for receiving an activecast request message from a target Relay Station (RS), wherein the activecast request message is received if a strength of a signal, received from a Mobile Station (MS) to the target RS, measured by the target RS, is greater than or equal to a threshold;
   a controller for determining whether to perform activecasting which is a simultaneous multicasting scheme for the purpose of minimizing Relay Station to Relay Station (RS-to-RS) handover delay, on the MS performing RS-to-RS handover, upon receiving the activecast request message;
   a scheduler for allocating multicasting resources by taking into consideration a channel condition between the MS and a serving RS, when it is determined to perform activecasting; and
   a transmitter for multicasting a packet, which is to be transmitted to the MS, to the target RS and the serving RS by using the allocated multicasting resources.

2. The apparatus of claim 1, further comprising a generator for generating an activecast start message for indicating to the target RS of the start of multicasting.

3. The apparatus of claim 1, wherein the controller detects information on a packet completely transmitted from the serving RS, and allows the packet information to be transmitted to the target RS.

4. The apparatus of claim 1, wherein the transmitter ends the multicasting when one of the MS completes RS handover and when an activecast end request is requested for one of the target RS and the MS.

5. A Relay Station (RS) apparatus in a multi-hop relay Broadband Wireless Access (BWA) system, comprising:
   a measurer for measuring a strength of a signal received from a Mobile Station (MS);
   a generator for generating an activecast request message to be transmitted to the Base Station (BS) if the signal strength is greater than or equal to a threshold;
   a processor for detecting multicasting resource region information indicating a resource region from an activecast start message received from the BS, wherein the multicasting resource region is determined by taking into consideration a channel condition between the MS performing Relay Station to Relay Station (RS-to-RS) handover and a serving RS of the MS;
   a receiver for receiving a packet which is to be transmitted to the MS by using the resource region; and
   a buffer for storing the received packet.

6. The apparatus of claim 5, wherein the activecast start message contains information on the resource region included in the packet of a signal transmitted from the BS.

7. The apparatus of claim 5, wherein the buffer deletes the stored packet upon receiving an activecast end message from the BS.

8. The apparatus of claim 5, wherein the buffer deletes a packet upon receiving information on a packet completely transmitted from the BS.

9. The apparatus of claim 5, wherein the generator generates an activecast end request message if the signal strength is less than the threshold.

10. A method of transmitting a packet of a Base Station (BS) in a multi-hop relay Broadband Wireless Access (BWA) system, the method comprising the steps of:
    receiving an activecast request message from a target Relay Station (RS), wherein the activecast request message is received if a strength of a signal, received from a Mobile Station (MS) to the target RS, measured by the target RS, is greater than or equal to a threshold;
    determining whether to perform activecasting which is a simultaneous multicasting scheme for the purpose of minimizing Relay Station (RS)-to-RS handover delay, on the MS, upon receiving the activecast request message;
    allocating multicasting resources by taking into consideration a channel condition between the MS and a serving RS, when it is determined to perform activecasting;
    multicasting a packet, which is to be transmitted to the MS, to the target RS and the serving RS by using the allocated multicasting resources.

11. The method of claim 10, further comprising, after the determining of whether to perform activecasting, transmitting an activecast start message for informing the target RS of the start of multicasting.

12. The method of claim 10, further comprising:
    detecting information on a packet completely transmitted from the serving RS; and
    transmitting the packet information to the target RS.

13. The method of claim 10, wherein the activecasting is ended when one of the MS completes RS handover and an activecast end request is requested for one of the target RS and the MS.

14. A method of relaying a packet of a Relay Station (RS) in a multi-hop relay Broadband Wireless Access (BWA) system, comprising the steps of:
    measuring a strength of a signal received from the MS;
    generating an activecast request message to be transmitted to the BS if the signal strength is greater than or equal to a threshold;
    detecting multicasting resource region information indicating a resource region from an activecast start message received from a Base Station (BS), wherein the multicasting resource region is determined by taking into consideration a channel condition between a Mobile Station (MS) performing Relay Station to Relay Station (RS-to-RS) handover and a serving RS of the MS;

receiving a packet which is to be transmitted to the MS by using the resource region; and storing the received packet.

15. The method of claim 14, wherein the activecast start message contains information on the resource region included in the packet of a signal transmitted from the BS.

16. The method of claim 14, further comprising:

determining if an activecast end message is received from the BS; and deleting the stored packet.

17. The method of claim 14, further comprising:

determining if information on a completely transmitted packet is received from the BS; and upon receiving the information on a completely transmitted packet, deleting the packet.

18. The method of claim 14, further comprising transmitting an activecast end request message to the BS if the signal strength is less than the threshold.

19. The method of claim 14, further comprising transmitting the stored packet to the MS after being connected to the MS by performing the RS handover.

* * * * *